United States Patent Office 3,405,415
Patented Oct. 15, 1968

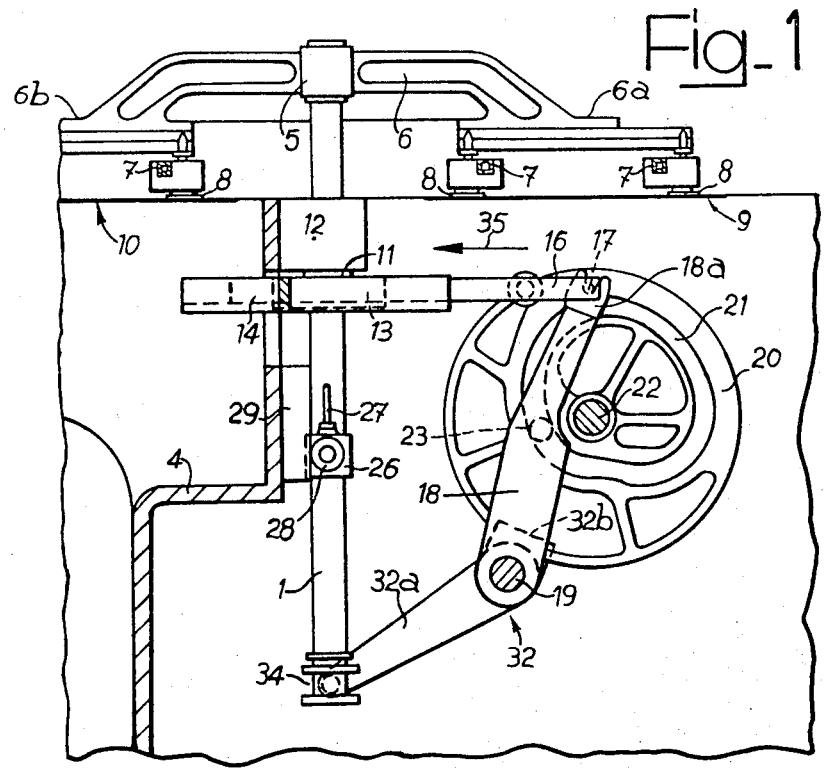
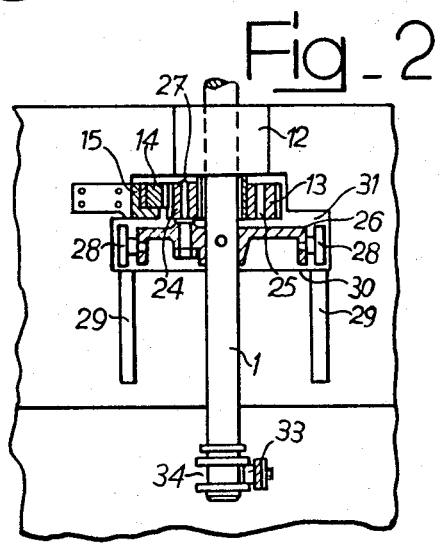

3,405,415
BOOK COVERS MANUFACTURING MACHINE
Lorenzo Depetris and Giovanni Depetris, Milan, Italy, assignors to Smyth Europea S.p.A., Milan, Italy
Continuation-in-part of application Ser. No. 334,866, Dec. 31, 1963. This application Feb. 16, 1967, Ser. No. 616,567
4 Claims. (Cl. 11—2)

ABSTRACT OF THE DISCLOSURE

The vertically movable shaft carrying two or more suction heads is roated always in the same sense by a reciprocating rack through a gear which is intermittently coupled with the shaft. To this end the gear is rotatably mounted on the said shaft and has provided therein two diametrically opposed holes. The shaft carries a cross-member provided with an upstanding pin which engages one of said holes when the shaft is in a fully lifted position and which is kept free of said gear to enable it to rotate freely when the shaft is in a fully lowered position.

---

This application is a continuation-in-part of our prior copending application Ser. No. 334,866 filed Dec. 31, 1963 now Patent No. 3,334,758 issued Aug. 8, 1967.

This invention relates to an automatic or semi-automatic machine for manufacturing book covers of the general type described in the specification of our co-pending application No. 334,866 filed Dec. 31, 1963 now Patent No. 3,334,758 issued Aug. 8, 1967.

The machine according to the said co-pending application includes a conveyor comprising at least one suction head carried by a vertical shaft which is movable vertically between a lowered position and a lifted position and rotatable step by step so that the suction head receives paperboard blanks and back portions from a squaring station and transfers them to a platform. The machine also includes means for removing finished book covers from the platform and discharging them from the machine.

The present invention is specifically concerned with improved means for rotating the said vertical shaft.

In known machines of this type provided with one suction head only, the vertical shaft carries a gear wheel, meshing at least when said shaft is fully lifted, with a rack arranged in a plane perpendicular to the axis of said shaft and performing a reciprocating motion.

In order to move the suction head carried by an arm secured to the top of the said vertical shaft from the receiving or feed station to the platform and back, the reciprocating motion of the rack is controlled by a cam carried by the main drive shaft. The cam is shaped to avoid any movement of the rack and consequent rotation of the vertical shaft and when the latter is in its lowered position or while it is moving from its lowered to its lifted position or vice-versa. Thus, the connection between the rack driven gear wheel and vertical shaft should be of such a nature as to allow axial displacements of the vertical shaft with respect to the gear wheel meshing with the rack and simultaneously prevent relative rotation of the shaft and gear wheel.

Furthermore, in machines having two suction heads offset from each other through 180°, symmetrically arranged to the vertical shaft axis, the vertical shaft should constantly rotate in the same direction notwithstanding the reciprocating movement of the rack. This necessitates disconnecting the rack driven gear from the vertical shaft during the return stroke of the rack after having rotated through 180° the gear together with the vertical shaft in order to simultaneously displace one suction head from its position above the squaring station to a position above the platform and the other suction head from its position above the platform to a position above the squaring station.

The object of the present invention is to provide a machine for manufacturing book covers with the vertical shaft carrying two or more suction heads and always rotating in the same sense.

In such a machine there is provided in accordance with the invention, a pin and hole driving connection between the gear wheel and the shaft, which engages when the shaft is in a fully lifted position, and which disengages when the shaft is lowered to enable the gear wheel to rotate freely in the opposite sense during the return stroke of the rack.

In order that the invention may be clearly understood one particular embodiment thereof will now be described, by way of example, with reference to the accompanying drawings, wherein:

FIGURE 1 is a diagrammatic part sectional side view showing the vertical shaft carrying the suction head and details of the means controlling the rotation, lifting and lowering of the vertical shaft, and FIGURE 2 is a side elevational view as seen from the right of FIGURE 1 with the shaft in the fully lifted position and the pin and hole connection in engagement.

In the embodiment of the machine shown in the drawings the vertical shaft 1 is arranged between the sidewalls of the machine frame, near the rear cross wall 4. The shaft 1 has secured to its top the hub 5 of a double arm 6 carrying the suction or picker heads 6a and 6b which are similar and symmetrical with respect to the axis of the shaft 1. The branches of the double arm 6 each carry a pair of cross members 7 having secured at opposite ends thereto suction necks 8 for lifting the paperboard blanks (not shown). The suction necks are connected by conduits (not shown) with a source of vacuum.

The shaft 1 is rotatably mounted in the machine frame and is displaceable in height between a lowered position shown in FIGURE 1, in which one suction head picks up the back portion and paperboard blanks (not shown) at the squaring station 9, and the other suction head simultaneously deposits the back portion and paperboard blanks on the platform 10, and a lifted position shown in FIGURE 2.

The shaft 1 extends through a sleeve 11 rotatably mounted by means of roller bearings (not shown) inside a stationary block 12 secured to the rear cross wall 4. The sleeve 11 has its lower portion extending below the block 12, the said lower portion having keyed thereon a gear wheel 13 (see FIGURE 2). This gear wheel 13 meshes with a rack 14 slidably mounted in an L-shaped guide 15 (FIGURE 2). One end of the rack 14 is articulated through a link 16 and a cross pivot 17 to a fork 18a provided at the upper end of a lever 18 rockingly mounted on the stationary cross-shaft 19. The lever 18 is arranged adjacent a disc 20 formed at its side facing the lever 18 with a continuous cam-shaped groove 21 and keyed on the camshaft 22 of the machine which is rotated in a known manner by means of a suitable gearing from the driving motor (not shown) of the machine. A roller 23 rides in the cam-shaped groove 21 and is rotatably mounted on a pivot extending from the lever 18 towards the disc 20. The groove 21 is so shaped as to reciprocate the rack 14 during each full rotation of the camshaft 22 and effect rotation of the gear wheel 13 through 180° during the movement of the rack 14.

In order to provide a driving connection between the vertical shaft and the gear wheel, the gear wheel 13 is provided with a pair of eccentric holes 24 and 25 (FIGURE 2) symmetrically arranged with respect to the axis of the gear wheel and offset from each other by 180°. The shaft 1 has keyed thereto a cross-member 26 carrying a peg or pin 27 fitting in the lifted position of the vertical shaft 1, into one or the other of the holes 24 and 25 in the gear wheel 13. The cross-member 26 carries at each end, a pivot on which a roller 28 is rotatably mounted. During the main part of the displacements in height of the shaft 1, each of the rollers 28 rolls along a guideway 29 secured to the rear cross-wall 4 of the machine frame, thus preventing any rotation of the shaft 1. The guideways 29 terminate at the level of the lower edge 30 of an opening 31 provided in the rear cross wall 4 near the level at which the gear wheel 13 is arranged. The part of the opening lying below the gear wheel 13 is wide enough to admit free rotation of the cross member 26 with its rollers 28 when the shaft 1 is in its fully lifted position in which the peg or pin 27 is engaged in one or the other of the holes 24 or 25 in the gear wheel 13, as shown in FIGURE 2.

The axial displacements of the vertical shaft are controlled by the rocking movement of a double-armed lever 32 mounted for rotation on the shaft 19. The lower arm 32a of the lever 32 carries a rotatable lug 33 (FIGURE 2) which engages in an annular circumferential groove 34 provided in the lower end of the vertical shaft 1. The upper arm 32b of the lever 32 carries a roller (not shown) riding in a cam-shaped groove provided on one side of a disc (not shown) keyed on the camshaft 26 like the disc 20. The cam grooves controlling the rocking movements of the levers 18 and 32 are so shaped and angularly shifted with respect to one another that the forward displacement in the direction of the arrow 35 (FIGURE 1) of the rack 14, and consequently the rotation of the shaft 1, cannot take place until the cross-member occupies a position above the lower edge 30 of the opening 31 whereas the return stroke of the rack 14 can be performed only when the rollers 28 on the cross-member 26 are in the guideways 29, thus preventing any possible rotation of the shaft 1, and the peg or pin 27 is fully disengaged from the gear wheel 13.

What we claim is:

1. A machine for manufacturing book covers having two or more suction heads mounted on a vertically movable shaft which is rotated by a rack through a gear wheel and always in the same sense, wherein a pin and hole driving connection is provided between the shaft and its driving gear wheel, which engages when the shaft is in a fully lifted position, and which disengages to enable the gear wheel to rotate freely in the opposite sense during the return stroke of the rack.

2. A machine according to claim 1, wherein the holes are provided in the gear wheel and the pin is connected to the shaft.

3. A machine according to claim 2, wherein the driving connection comprises a gear wheel provided with a pair of eccentric holes symmetrically arranged with respect to the gear axis and offset from each other by 180° and a pin connected to the shaft and adapted to fit into one of the other of said holes when the shaft is in the fully lifted position.

4. A machine according to claim 3, wherein means are provided for guiding the shaft during its vertical movements, said means comprising a cross-member connected to the shaft and carrying a roller at each of its ends, the rollers co-operating with guideways in the frame of the machine of such a length that rotation of the shaft is prevented during its vertical movements except when it is in its fully lifted position.

References Cited
UNITED STATES PATENTS 3,237,223   3/1966   Taylor _____ 11—2

LAWRENCE CHARLES, *Primary Examiner.*